United States Patent [19]

Yabuta

[11] Patent Number: 4,829,120
[45] Date of Patent: May 9, 1989

[54] METHOD OF PRODUCING DISPERSION OF FINE PARTICLES OF GELLED POLYMER

[75] Inventor: Motoshi Yabuta, Hiratsuka, Japan

[73] Assignee: Kansai Paint Co., Ltd., Hyogo, Japan

[21] Appl. No.: 17,071

[22] Filed: Feb. 20, 1987

[30] Foreign Application Priority Data

Feb. 22, 1986 [JP] Japan .................................. 61-36517

[51] Int. Cl.$^4$ ................................................ C08F 2/16
[52] U.S. Cl. ..................................... 524/460; 524/556; 525/450
[58] Field of Search ................. 524/460, 539; 525/450

[56] References Cited

U.S. PATENT DOCUMENTS 4,340,511 7/1982 Backhouse ........................... 525/450

Primary Examiner—Joseph L. Schofer
Assistant Examiner—Peter D. Melcahy
Attorney, Agent, or Firm—Wenderoth, Lind & Ponack

[57] ABSTRACT

A method of producing a dispersion of fine particles of a gelled polymer, which comprises polymerizing a vinyl monomer mixture containing at least two vinyl monomers having complementary functional groups capable of being bonded to each other by reaction each in an amount of at least 0.5% by weight, or a vinyl monomer mixture containing at least 0.5% by weight of a polyvinyl monomer containing at least two polymerizable double bonds in an organic liquid incapable of dissolving the polymer formed from the monomer mixture, in the presence of a macromer having a number average molecular weight of at least 1,000 resulting from introduction of polymerizable double bonds into a self-condensation product of 12-hydroxystearic acid, the number of the polymerizable double bonds being 0.7 to 1.0 per molecule of the self-condensation product on an average.

14 Claims, No Drawings

METHOD OF PRODUCING DISPERSION OF FINE PARTICLES OF GELLED POLYMER

This invention relates to a method of producing a dispersion of fine particles of a gelled polymer, and more specifically, to a method of producing a stable dispersion of fine particles of a gelled polymer efficiently within a short period of time.

Various methods have heretofore been proposed for the production of fine particles of a gelled polymer (microgels) which are stable in an organic solvent composed mainly of an aliphatic hydrocarbon (see, for example, U.S. Pat. Nos. 3,607,821, 4,147,688, and Japanese Laid-Open Patent Publication No. 161431/1984). These methods commonly comprise forming dispersed polymer particles in the presence of a dispersion stabilizer composed of a first segment to be solvated by an organic solvent and a second segment which is hardly solvated by the organic solvent but is associated with, or anchored to, the dispersed polymer particles, and thereafter crosslinking the particles.

A typical example of the dispersion stabilizer is a product obtained by graft-copolymerizing or block-copoymerizing a self-condensation product of 12-hydroxystearic acid as a solvatable component with polymethyl acrylate or a polyepoxide resin as a non-solvatable component. Such a stabilizer is a block or graft copolymer composed of two segments of the solvatable component and the non-solvatable component. Furthermore, since it is necessary to introduce at least one polymerizable double bond into the non-solvatable component, synthesis of this copolymer must go through very complex reaction processes. Moreover, it takes as long as 40 to 70 hours, and the efficiency of producing the dispersed polymer particles is inferior.

The present inventors therefore made extensive investigations in order to develop an efficient method which can shorten the production time as compared with the conventional methods described above without impairing the properties of the resulting dispersion of fine particles of a gelled polymer. These investigations have now led to the discovery that this purpose cn be achieved by using a macromer resulting from introduction of a polymerizable double bond into a self-condensation product of 12-hydroxystearic acid (the macromer denotes a substantially linear giant monomer having one ethylenically unsaturated terminal group per molecule on an average and a molecular weight of at least 1,000) as a dispersion stabilizer component; and that when the resulting fine gelled polymer particles are used for rheology control of paints which is a usual application of such polymer particles, they exhibit excellent performance comparable to those produced by the aforesaid conventional methods.

Thus, according to this invention, there is provided a method of producing a dispersion of fine particles of a gelled polymer, which comprises polymerizing a vinyl monomer mixture containing at least two vinyl monomers having complementary functional groups capable of being bonded to each other by reaction each in an amount of at least 0.5% by weight, or a vinyl monomer mixture containing at least 0.5% by weight of a multifunctional vinyl monomer (hereinafter referred to as "polyvinyl monomer") containing at least two polymerizable double bonds in an organic liquid incapable of dissolving the polymer formed from the monomer mixture, in the presence of a macromer having a number average molecular weight of at least 1,000 resulting from introduction of polymerizable double bonds into a self-condensation product of 12-hydroxystearic acid, the number of polymerizable double bonds being 0.7 to 1.0 per molecule of the self-condensation product on an average.

The macromer used in this invention is obtained by introducing polymerizable double bonds into the self-condensation product of 12-hydroxystearic acid (to be sometimes referred to as "P-12HSA") which may be the same as the solvatable component in the dispersion stabilizer used in the aforesaid conventional methods. Such a macromer can be produced, for example, by (i) adding a monoepoxy group-containing unsaturated monomer such as glycidyl acrylate or methacrylate to the terminal carboxyl group of P-12HSA in the presence of a catalyst such as a tertiary amine, or (ii) reacting the terminal carboxyl group or the secondary hydroxyl group of P-12HSA with an isocyanate group-containing unsaturated monomer, for example an isocyanatoalkyl acrylate or methacrylate (e.g., isocyanatoethyl acrylate or methacrylate), m-isopropenyl-alpha, alpha-dimethylbenzyl isocyanate, or an equimolar adduct of a diisocyanate compound with a hydroxyalkyl acrylate or methacrylate.

When the macromer is produced by the method (ii), there is a possibility of introducing two or more polymerizable double bond per molecule. The macromer used in this invention should contain about 1.0 polymerizable double bond per molecule on an average. If more polymerizable double bonds are introduced, the entire reaction mixture is likely to be gelled during the production of fine gelled polymer particles. Accordingly, introduction of polymerizable double bonds in an amount of more than about 1.0 per molecule on an average should be avoided.

The macromer used in this invention may contain 0.7 to 1.0, preferably 0.9 to 1.0, polymerizable double bond per molecule on an average. Accordingly, in the method (ii) above, it is desirable to react 1.0 mole of P-12HSA with 0.7 to 1.0 mole of the isocyanate group-containing unsaturated monomer. As a result, double bonds can be introduced into the secondary hydroxyl group of P-12HSA almost selectively at a rate of 0.7 to 1.0 per molecule. In the production of the macromer, a known polymerization inhibitor or as required a catalyst such as a tertiary amine or dibutyltin dilaurate can usually be employed.

An especially preferred macromer for use in this invention is one resulting from addition of a glycidyl acrylate or methacrylate to the terminal carboxyl group of the self-condensation product of 12-hydroxystearic acid.

The macromer may have a number average molecular weight of at least 1,000, preferably 1,300 to 2,300, especially preferably about 1,500 to about 2,000. If the molecular weight of the macromer is much lower than 1,000, the steric repulsive layer of the resulting fine polymer particles has a decreased thickness. This causes the defect that the dispersed particles tend to aggregate or become coarse particles.

The vinyl monomer mixture to be copolymerized in the presence of the macromer in this invention contains as essential components at least two vinyl monomers having complementary functional groups capable of being bonded by reaction, or a polyvinyl monomer. Examples of a combination of the complementary functional groups capable of being bonded to each other by reaction include
(i) an epoxy group/a carboxyl group,
(ii) a hydroxyl group/ an isocyanate group,
(iii) an epoxy group/an amino group, and
(iv) an isocyanate group/an amino group.

Specific examples of a combination of at least two vinyl monomers having such complementary functional groups are given below.

Examples relating to (i) above

Combinations of epoxy group-containing vinyl monomers such as glycidyl acrylate, glycidyl methacrylate and allyl glycidyl ether and carboxyl group-containing vinyl monomers such as acrylic acid, methacrylic acid and crotonic acid.

Examples relating to (ii) above

Combinations of hydroxyl group-containing vinyl monomers such as a hydroxyalkyl acrylate or methacrylate (e.g., hydroxyethyl acrylate or methacrylate) and isocyanate group-containing vinyl monomers such as an isocyanatoalkyl acrylate or methacrylate (e.g., isocyanatoethyl acrylate or methacrylate), m-isopropenyl-alpa, alphadimethylbenzyl isocyanate, or an adduct of isophorone diisocyanate and a hydroxyalkyl acrylate or methacrylate (e.g., hydroxyethyl acrylate or methacrylate) in equal proportions.

Examples relating to (iii)

Combinations of the aforesaid epoxy group-containing vinyl monomers and aminoalkyl acrylates or methacrylates such as aminoethyl acrylate or methacrylate.

Examples relating to (iv)

Combinations of the aforesaid isocyanate group-containing vinyl monomers and the aforesaid aminoalkyl acrylates or methacrylates.

The polyvinyl monomer is a vinyl monomer containing at least two, preferably 2 to 4, polymerizable double bonds per molecule, and includes, for example, divinylbenzene, ethylene glycol diacrylate, ethylene glycol dimethacrylate, diethylene glycol diacrylate, and an adduct of isocyanatoethyl acrylate, or methacrylate with hydroxyethyl acrylate or methacrylate, trimethylolpropane or pentaerythritol.

At least two vinyl monomers having the aforesaid complementary functional groups are present in the vinyl monomer mixture each in a concentration of at least 0.5% by weight, preferably 0.5 to 20% by weight, more preferably 1 to 10% by weight. These vinyl monomers serve to crosslink the fine polymer particles to be prepared, and the amounts and kinds of these monomers or their combination can be selected as desired according to the properties desired of the final fine polymer particles. Especially preferred monomers are vinyl monomers having the combination of complementary functional groups described in (i) and polyvinyl monomers selected from divinylbenzene, ethylene glycol dimethacrylate and an adduct of isocyanatoethyl acrylate and hydroxyethyl acrylate.

The vinyl monomer mixture may contain at least one other copolymerizable vinyl monomer in addition to the aforesaid two or more vinyl monomers having complementary functional groups or the polyvinyl monomer. Any radical polymerizable unsaturated monomer may be used as the other vinyl monomer. Typical examples are shown below.

(a) Esters of acrylic or methacrylic acid, for example $C_{1-18}$ alkyl acrylates or methacrylates such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-8}$ alkenyl acrylates or methacrylates such as allyl acrylate or methacrylate; glycidyl acrylate or methacrylate; $C_{2-8}$ hydroxyalkyl acrylates or methacrylates such as hydroxyethyl acrylate, hydroxyethyl methacrylate, hydroxypropyl acrylate and hydroxypropyl methacrylate; and $C_{3-18}$ alkenyloxyalkyl acrylates or methacrylates such as allyloxyethyl acrylate or methacrylate.

(b) Vinyl aromatic compounds such as styrene, alpha-methylstyrene, vinyltoluene, p-chlorostyrene and vinylpyridine.

(c) Alpha,beta-ethylenically unsaturated acids such as acrylic acid methacrylic acid and itaconic acid.

(d) Other vinyl monomers such as acrylonitrile, methacrylonitrile, methyl isopropanyl ketone, vinyl acetate, Veoba monomer (Shell Chemical Co.), vinyl propionate and vinyl pivalate.

Among the above vinyl monomers, the acrylates or methacrylates (a) are preferred. Methyl methacrylate is especially preferred. The above monomers (a) desirably occupy at least 50% by weight of the vinyl monomer mixture.

Polymerization of the monomer mixture can be carried out in accordance with a radical polymerization method known per se. Examples of radical polymerization initiators that can be used in the polymerization are azo initiators such as 2,2-azoisobutyronitrile and 2,2'-azobis(2,4-dimethylvaleronitrile), and peroxide initiators such as benzoyl peroxide, lauryl peroxide and tert-butyl peroctoate. The initiator may be used in an amount of 0.5 to 10 parts by weight, preferably 0.3 to 3 parts by weight, per 100 parts by weight of the monomer mixture to be polymerized.

The proportions of the macromer and the vinyl monomer mixture used in the present invention are not critical, and may be varied according to their types, etc. If the amount of the macromer used is extremely small, coarse polymer particles are liable to form and the resulting dispersion has inferior stabililty. On the other hand, if the amount of the macromer used is excessively large, polymer particles having a very small particle diameter are formed. The use of a dispersion having such very small polymer particles in paints has the defect that its action to control rheology is reduced, or the resulting coated film loses gloss. It is convenient therefore that the ratio of the macromer to the vinyl monomer mixture used is generally from 5:95 to 50:50, preferably from 10:90 to 30:70, more preferably from 10:90 to 20:80, in percent by weight.

The organic liquid used as a dispersing medium in the method of this invention denotes a substantially water-immiscible organic liquid which does not substantially dissolve the resulting dispersed polymer particles, but becomes a good solvent for the macromer and the vinyl monomer mixture. Specific examples of the organic liquid are petroleum-type aliphatic hydrocarbons such as hexane, heptane, octane and mineral spirit. They may be used singly or in combination with another organic solvent having relatively low polarity such as toluene, xylene or butyl acetate. Very desirably, the proportion of the petroleum-type aliphatic hydrocarbon is at least 60% by weight in such a combination.

The copolymerization of the vinyl monomer in the orgnaic liquid in the presence of the macromer can be carried out by a known method, for example the methods described in U.S. Pat. Nos. 3,607,821 and 4,147,688. The polymerization tempeature is generally 60° to 160° C., preferably 90° to 120° C. Usually the reaction can be terminated in 4 to 8 hours.

The fine particles of the crosslinked gelled polymer in accordance with this invention may be prepared by, for example, forming dispersed polymer particles in advance, and then performing crosslinking reaction within the dispersed polymer particles through the complementary functional groups using a tertiary amine catalyst; or by including the tertiary amine catalyst in the vinyl monomer mixture or other organic liquid, and performing the crosslinking reaction of the polymer particles simultaneously with the polymerization reaction of forming the dispersed polymer particles. In the latter method, the concentration of the vinyl monomer mixture in the reaction system is desirably made lower than that in the former method in order to avoid gellation of the entire polymerization system.

The tertiary amine catalyst used as a catalyst for the reaction between the complementary functional groups is not particularly limited, and includes, for example, dimethylaminoethanol, diethylaminoethanol and N,N-dimethyl-n-dodecylamine.

The important requirement of the polymerization reaction in the method of this invention as described in (i) above is that the monomer concentration in the organic liquid should be maintained low, and that the distances betweeen dispersded polymer particles being formed should be sufficiently large. To meet the former requirement, it is important to give a temperature sufficient to decompose the polymerization initiator so as to increase the rate of polymerization of the monomers, and also to control the rate of feeding the monomers suitably. If the concentration of the monomers in the reaction system increases remarkably, the entire reaction system is likely to be gelled.

To meet the latter requirement, it is important to limit the concentration of the dispersed polymer particles formed below a certain point. Specifically, it is desirable to perform the copolymerization reaction while the concentration of the formed dispersed polymer particles is limited to not more than 40% by weight, preferably not more than 30% by weight. If the concentration of the dispersed polymer particles exceeds 40% by weight, the dispersed polymer particles are liable to be gelled or become coarse particles.

When the particles are to be gelled by using the polyvinyl monomer, the entire polymerization system may sometimes be gelled if the copolymerization is carried out in a high monomer concentration. To prevent it, the copolymerization should be carried out while the concentration of the dispersed polymer particles is kept lower than in the method described in (i) above.

The resulting dispersion of fine gelled polymer particles can be used, after optionally removing the solvent partly under reduced pressure, as a dispersion having a final solids concentration of 40 to 60% by weight.

The process of formation of the fine particles of a gelled polymer in this invention is presumed to proceed as follows. The macromer and the vinyl monomers are first random-copolymerized, and the polymer molecules grow. When the molecular weight of the copolymer increases to some extent, the alkyl groups in the polymerized monomers and the long-chain hydrocarbon chains in the macromer are naturally oriented outwardly as a solvatable component by their affinity for the organic liquid and local differences in surface tension within the copolymer molecules in the resulting dispersed polymer particles. As a result, self-stabilized fine particles of the gelled polymer are formed.

Since the macromer used in the invention can be easily synthesized within a short period of time unlike the case of the conventional dispersion stabilizers, the dispersion can be synthesized within a time $\frac{1}{2}$ to $\frac{1}{3}$ shorter than that required in the prior art. In addition, the resulting dispersion has very good stability, and properties comparable to dispersions obtained by the prior art. It can be used in various applications, as paints, molded articles, adhesives, fillers, etc. It is especially useful for preventing sagging at the time of thick coating of a clear paint or a solid color paint as a top coating for automobiles, and particularly for controlling orientation of a metal flaky pigment in a base metallic paint and fixing the pigment and preventing mixing of two layers of the base paint and a top clear paint overcoated in the two-coat one-bake system.

The dispersion provided by the method of this invention can be directly used. As required, a coloring agent, a plasticizer, a curing agent, etc. may be incorporated in it. The coloring agent may include dyes, organic pigments and inorganic pigments. The plasticizer may be those known heretofore, for example low-molecular-weight plasticizers such as dimethyl phthalate and dioctyl phthalate, and high-molecular-weight plasticizers such as vinyl polymer-type plasticizers and polyester-type plasticizers. They may be mixed with the dispersion. Alternatively, it is possible to dissolve them in radical polymerizable monomers at the time of producing the dispersion and thus distribute them in the resulting dispersed polymer particles. As the curing agent, a crosslinking agent such as an amino resin or an epoxy resin may be used.

The following Examples and Comparative Examples illustrate the present invention more specifically. In these examples, all parts and percentages are by weight.

EXAMPLE 1

Synthesis of macromer (A)

A 2-liter flask equipped with a water separator and a condenser was charged with 740 parts of 12-hydroxystearic acid and 132 parts of toluene, and these materials were heated to 140° C. After 12-hydroxystearic acid was completely dissolved, 1.5 parts of methanesulfonic acid was added, and dehydrocondensation reaction was continued for about 8 hours to give P-12HSA having an acid value of 29.5 mg KOH/g of resin and a number average molecular weight of 1,800. To the resulting resin were added 0.7 part of p-tert-butyl catechol, 89.5 parts of glycidyl methacrylate and 3.0 parts of N,N-dimethyl-n-dodecylamine, and the mixture was heated at 140° C. for about 8 hours until the acid value of the resin became 0.3 or less. The reaction product was cooled and diluted with 353 parts of mineral spirit to obtain a brown clear macromer (A) solution having a solids content of 60%.

Synthesis of gelled polymer particles

A 5-liter flask equipped with a condenser was charged with 475 parts of Shellsol 340 (a hydrocarbon solvent made by Shell Chemical Co.) and 855 parts of heptane, and heated by an electrically heated mantle to 98° C. at which heptane refluxed. A solution of a monomeric mixture composed of the following components was fed into the flask by a metering pump at a uniform rate over the course of 5 hours.

| Components | Parts |
| --- | --- |
| 2,2-azoisobutyronitrile | 8.5 |
| methyl methacrylate | 1059 |
| glycidyl methacrylate | 12.2 |
| acrylic acid | 24.3 |
| styrene | 121.7 |
| 50% macromer (A) solution | 507 |
| Shellsol 340 | 500 |
| heptane | 500 |
| N,N—dimethyl-n-dodecylamine | 1.5 |

After feeding the above monomer mixture solution, the mixture was aged for about 30 minutes, and then 495 parts of toluene and 2.4 parts of 2,2-azo-isobutyronitrile were added dropwise to the mixture over 1 hour, and the mixture was further aged for 1.5 hours to form a dispersion of fine particles of a gelled polymer.

Then, 1,304 parts of heptane was recovered from the dispersion by refluxing for 2 hours to concentrate the dispersion.

In the dispersed particles, the ratio of the macromer (A) to the monomer mixture was 20:80, and the monomeric mixture consisted of 87% of methyl methacrylate, 10% of sytrene, 1% of glycidyl methacrylate and 2% of acrylic acid. The concentration of the dispersion was 35% before the concentrating operation.

The resulting dispersion was a stable opalescent dispersion having a solids content of 50% and being free from coarse particles. It had an average particle diameter, measured by a Coulter N-4 Model (Coulter Counter Co., Ltd.), of 273 nm. When a small amount of the dispersion was added dropwise to acetone and the mixture stirred, the particles did not dissolve because they were crosslinked, but a whitely turbid dispersion of the dispersed particles in acetone resulted.

EXAMPLE 2

Example 1 was repeated except that the vinyl monomers in the monomeric mixture were changed to 1,071 parts of methyl methacrylate, 121.7 parts of styrene and 24.4 parts of ethylene glycol diacrylate, and N,N-dimethyl-n-dodecylamine was not added. The resulting dispersion was a stable dispersion free from coarse particles as in Example 1. The dispersion had an average particle diameter of 310 mm.

COMPARATIVE EXAMPLE 1

In the procedure of Example 1, 500 g of heptane and 500 parts of Shellsol 340 in the monomeric mixture solution were not used, and the monomers were added dropwise over 3 hours. In the early stage of the reaction, a clear dispersion formed. But gradually, the dispersion became thicker, and finally became a dispersion having a high viscosity and containing coarse particles having a particle diameter of 5 to 15 micrometers. When it was cooled and left to stand, it tended to separate into two layers with the formation of an upper clear layer.

EXAMPLE 3

The same flask as used in Example 1 was charged with 475 parts of Shellsol 340 and 855 parts of heptane, and heated to 98° C. A monomeric mixture composed of the following components was fed into the flask by a metering pump at a uniform rate over 4 hours.

| Components | Parts |
| --- | --- |
| t-butyl peroctoate | 8.5 |
| methyl methacrylate | 1095.6 |
| m-isopropenyl-alpha,alpha-dimethylbenzyl isocyanate | 60.9 |
| hydroxypropyl metahcrylate | 60.9 |
| 60% macromer (A) solution (obtained in Example 1) | 358.9 |
| Shellsol 340 | 500 |
| heptane | 500 |

After feeding the monomeric mixture solution, the mixture was aged for 30 minutes, and the mixture of 495 parts of heptane and 2.4 parts of t-butyl peroctoate was added dropwise over 1 hour. The mixture was aged for 1.5 hours, and 1.2 parts of dimethyltin dilaurate was added at a time, and the mixture was aged for 1 hour.

The dispersion was then concentrated by recovering 1217.0 parts of heptane from the dispersion over 2 hours by refluxing.

The ratio of the macromer (A) to the monomeric mixture in the resulting dispersed particles was 15:85, and the monomeric mixture consisted of 90.0% of methyl methacrylate, 5.0% of m-isopropenyl alpha,alpha-dimethylbenzyl isocyanate, and 5.0 % of hydroxypropyl methacrylate. The concentration of the dispersion before the concentrating operation was 32.5%.

When a small amount of the dispersion was added dropwise to acetone and the mixture stirred, the dispersed particles did not dissolve. It was thus seen that the particles were highly crosslinked.

EXAMPLE 4

| Preparation of a top coat clear (A-1) | |
| --- | --- |
| 65% acrylic resin solution (*1) | 107.7 parts |
| Dispersion obtained in Example 3 | 13.3 parts |
| 70% Uban 20HS (**) | 42.9 parts |
| 1% Rabow No. 3 (*3) | 0.1 part |

(*1): An acrylic resin having a number average molecular weight of 6,100 obtained from 10 parts of methyl methacrylate, 30 parts of i-butyl methacrylate, 12 parts of n-butyl methacrylate, 20 parts of 2-ethylhexyl methacrylate, 25 parts of 2-hydroxyethyl methacrylate and 3 parts of methacrylic acid.
(*2): Melamine resin produced by Mitsui Toatsu Chemicals, Inc.
(*3): A silicon additive made by Rabow Chemical Co.

A mixture of the above ingredients was adjusted to a viscosity of 35 seconds (Ford cup No. 4/20° C.) with a mixed solvent composed of 35 parts of Shellsol 340, 35 parts of butyl Cellosolve and 30 parts of n-butanol to obtain a top coat clear paint having a solids concentration of 50%.

Preparation of top coat clear (A-2)

Prepared in the same way in accordance with the formulation of the top coat clear (A-1) except that the dispersion was excluded.

| Preparation of a base coat metallic paint (B-1) | |
| --- | --- |
| 70% acrylic resin solution (*4) | 85.7 parts |
| Dispersion of Example 1 | 40.6 parts |
| 88% Cymel 370 (*5) | 23.0 parts |
| Aluminum paste A (*6) | 10 parts |
| Aluminum paste B (*7) | 20 parts |

-continued

| Preparation of a base coat metallic paint (B-1) | |
|---|---|
| Carbon black | 0.05 part |

(*4): an acrylic resin having a number average molecular weight obtained from 15 parts of styrene, 15 parts of methyl methacrylate, 49 parts of ethyl acrylate, 20 parts of hydroxyethyl acrylate and 1 part of acrylic acid.
(*5): Melamine resin made by Mitsui Toatsu Chemicals, Inc.
(*6): Aluminum Paste #4919 (tradename for a product produced by Toyo Aluminum Co., Ltd.)
(*7): Aluminum Paste #55-519 (tradename for a product produced by Toyo Aluminum Co., Ltd.)

The above components were mixed and dispersed and using a mixed solvent composed of 30 parts of toluene, 30 parts of xylene, 30 parts of butyl acetate and 10 parts of butyl Cellosolve, a base coat metallic paint having a viscosity of 14 seconds (Ford cup No. 4/20° C.) and having a solids concentration of 39% was obtained.

Preparation of a base coat metallic paint (B-2)

Prepared in the same way as in the preparation of the base coat metallic paint (B-1) except that in the formulation of (B-1), 29.0 parts of an acrylic resin solution was used instead of 40.6 parts of the dispersion.

Coating tests

A steel plate electrodeposition-coated and coated with a surfacer was coated with the base coat metallic paint to a dry thickness of 10 to 15 microns by using an REA gun (an electrostatic air spray gun made by Nippon Ransburg Co., Ltd.), and after standing at room temperature for 3 minutes, the top coat clear paint was applied to it to a dry thickenss of 35 to 40 microns by using a Minibell G (a rotating electrostatic coating machine made by Nippon Ransburg Co., Ltd.). The coated plate was left to stand at room temperature for 10 minutes, and then dried at 140° C. for 30 minutes. The resulting coated plate was evaluated by the following tests, and the results are tabulated below.

| Test item | Test plate No. | | | |
|---|---|---|---|---|
| | 1 | 2 | 3 | 4 |
| Top coat clear | A-1 | A-2 | A-1 | A-2 |
| Base coat metallic | B-1 | B-1 | B-2 | B-2 |
| Metallic unevenness | ◉ | ◉ | X | X |
| Metallic whiteness | 64.3 | 62.5 | 52.6 | 51.5 |
| Gloss | 92.5 | 91.2 | 85.5 | 83.5 |
| Clearness | 1.0 | 0.9 | 0.6 | 0.5 |

The test methods were as follows:

Metallic unevenness

A coated surface, 30×45 cm, was evaluated by visual observation on the following standards.
◉: The metallic pigment oriented uniformly parallel to the coated surface, and no occurrence of metallic unevenness was observed.
Δ: Occurrence of metallic unevenness was observed over ⅓ to ½ of the coated surface.
X: Occurrence of metallic unevenness was observed on almost the entire surface.

Metallic whiteness

Measured by a color difference meter. The larger the measured value, the larger the degree of whiteness.

Gloss

Measured at a deflection angle of 20°.

Clearness

Measured at a fixed angle of 55° by using a clearness measuring instrument (JCRI-GGD-166-type Gd meter sold by Nippon Shikisai Kenkyusho).

What is claimed is:

1. A method of producing a dispersion of fine particles of a gelled polymer which comprises polymerizing
(A) a vinyl monomer mixture containing at least two vinyl monomers having complementary functional groups capable of being bonded to each other by reaction, each of said monomers having a complementary functional group being present in an amount of at least 0.5% by weight, based on the weight of the monomer mixture, said complementary functional group being selected from the group consisting of (1) a combination of an epoxy group and a carboxyl group, (ii) a combination of a hydroxyl group and an isocyanate group, (iii) a combination of an epoxy group and an amino group, and (iv) a combination of an isocyanate group and an amino group, or
(B) a vinyl monomer mixture containing at least 0.5% by weight of a polyvinyl monomer containing at least two polymerizable double bonds,
in a water-immiscible organic liquid incapable of dissolving the polymer formed from the monomer mixture, said polymerization being carried out in the presence of a macromer having a number average molecular weight of 1,300 to 2,300 resulting from the introduction of polymerizable double bonds into a self-condensation product of 12-hydroxy stearic acid, the number of the polymerizable double bonds being 0.7 to 1.0 per molecule of the self-condensation product on an average, wherein said macromer is produced by (i) adding glycidyl acrylate or methacrylate to the terminal carboxyl group of the self-condensation product of 12-hydroxy stearic acid, or (ii) reacting the terminal carboxyl group or the secondary hydroxyl group of the self-condensation product of 12-hydroxy stearic acid with an isocyanate group-containing an unsaturated monomer.

2. The method of claim 1 wherein the self-condensation product of 12-hydroxystearic acid has a number average molecular weight of about 1,500 to 2,000.

3. The method of claim 1 wherein the macromer results by addition of glycidyl acrylate or methacrylate to the terminal carboxyl group of the self-condensation product of 12-hydroxystearic acid.

4. The method of claim 1 wherein the number of polymerizable double bond of the macromer is 0.9 to 1.0 per molecule on an average.

5. The method of claim 1 wherein said at least two vinyl monomers are a combination of at least one epoxy group-containing vinyl monomer selected from glycidyl acrylate, glycidyl methacrylate and allyl glycidyl and at least one carboxyl group-containing vinyl monomer selected from acrylic acid, methacrylic acid and crotonic acid.

6. The method of claim 1 wherein the vinyl monomer mixture contains said at least two vinyl monomers each in a concentration of 0.5 to 20% by weight.

7. The method of claim 1 wherein the polyvinyl monomer is selected from divinylbenzene, ethylene glycol dimethacrylate and an adduct of isocyanatoethyl acrylate and hydroxyethyl acrylate.

8. The method of claim 1 wherein the vinyl monomer mixture contains the polyvinyl monomer in a concentration of 0.5 to 10% by weight.

9. The method of claim 1 wherein the vinyl monomer mixture further comprises an acrylic or methacrylic acid ester.

10. The method of claim 9 wherein the ester is methyl methacrylate.

11. The method of claim 1 wherein the weight ratio of the macromer to the vinyl monomer mixture is from 5:95 to 50:50.

12. The method of claim 1 wherein the organic liquid is a petroleum aliphatic hydrocarbon.

13. The method of claim 1 wherein the copolymerization is carried out at a temperature of 60° to 160° C.

14. The method of claim 1 wherein the concentration of the dispersed polymer particles formed is not more than 40% by weight.

* * * * *